(12) United States Patent
Mohanty et al.

(10) Patent No.: US 11,716,277 B2
(45) Date of Patent: Aug. 1, 2023

(54) INTEGRATED ROUTING AND BRIDGING ROUTE REDUCTION IN ETHERNET VIRTUAL PRIVATE NETWORK

(71) Applicant: Cisco Technology, Inc., San Jose, CA (US)

(72) Inventors: Satya Ranjan Mohanty, San Ramon, CA (US); Lukas Krattiger, Pleasanton, CA (US); Mankamana Prasad Mishra, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 137 days.

(21) Appl. No.: 17/173,387

(22) Filed: Feb. 11, 2021

(65) Prior Publication Data

US 2022/0255835 A1    Aug. 11, 2022

(51) Int. Cl.
*H04L 45/02* (2022.01)
*H04L 12/46* (2006.01)

(52) U.S. Cl.
CPC .......... *H04L 45/02* (2013.01); *H04L 12/4641* (2013.01)

(58) Field of Classification Search
CPC ........................... H04L 45/02; H04L 12/4641
USPC ....................................................... 370/254
See application file for complete search history.

(56) References Cited

U.S. PATENT DOCUMENTS

| 8,141,156 B1* | 3/2012 | Mao | H04L 45/021 |
| | | | 709/224 |
| 2016/0134528 A1* | 5/2016 | Lin | H04L 12/4641 |
| | | | 709/238 |
| 2016/0142310 A1* | 5/2016 | Means | H04L 63/0272 |
| | | | 370/392 |
| 2016/0191374 A1* | 6/2016 | Singh | H04L 45/24 |
| | | | 370/228 |
| 2016/0277210 A1 | 9/2016 | Lin et al. | |
| 2017/0195210 A1* | 7/2017 | Jacob | H04L 69/321 |

(Continued)

OTHER PUBLICATIONS

A. Sajassi et al., "Integrated Routing and Bridging in EVPN", Bess WorkGroup, Jun. 14, 2020, 34 pages.

(Continued)

*Primary Examiner* — Hassan Kizou
*Assistant Examiner* — Oladiran Gideon Olaleye
(74) *Attorney, Agent, or Firm* — Edell, Shapiro & Finnan LLC

(57) ABSTRACT

A method is performed at a provider edge node configured to communicate with remote provider edge nodes over an Ethernet virtual private network. The method includes receiving, from the remote provider edge nodes, route advertisements for a common subnet hosted on the remote provider edge nodes. The route advertisements include distinct remote route distinguishers, a common IP prefix for the common subnet, and remote paths for the common subnet. The method further includes determining whether there are at least a predetermined number of the remote paths preferred over a local path for the common subnet hosted on the provider edge node based on the remote route distinguishers and a local route distinguisher for the local path. The method includes, when there are at least the predetermined number of the remote paths preferred over the local path, suppressing sending of a route advertisement for the local path for the common subnet.

20 Claims, 5 Drawing Sheets

(56) References Cited

U.S. PATENT DOCUMENTS

| | | | |
|---|---|---|---|
| 2017/0317919 A1* | 11/2017 | Fernando | H04L 41/40 |
| 2018/0091420 A1* | 3/2018 | Drake | H04L 45/306 |
| 2018/0287990 A1 | 10/2018 | Bickhart et al. | |
| 2019/0229937 A1 | 7/2019 | Nagarajan et al. | |
| 2019/0305988 A1* | 10/2019 | Bickhart | H04L 12/4641 |
| 2020/0067830 A1 | 2/2020 | Malhotra et al. | |
| 2020/0259733 A1* | 8/2020 | Raj | H04L 45/12 |
| 2020/0322268 A1 | 10/2020 | Thoria et al. | |

OTHER PUBLICATIONS

Cisco, "Migration Overview", retrieved from Internet Jan. 10, 2021, 12 pages; https://www.cisco.com/c/en/us/td/docs/switches/datacenter/dfa/migration/guide/b-dfa-migration/b-dfa-migration_chapter_010.pdf.

A. Sajassi, Ed. et al., "BGP MPLS-Based Ethernet VPN", Internet Engineering Task Force (IETF), RFC 7432, ISSN: 2070-1721, Feb. 2015, 56 pages.

\* cited by examiner

INTEGRATED ROUTING AND BRIDGING ROUTE REDUCTION IN ETHERNET VIRTUAL PRIVATE NETWORK

TECHNICAL FIELD

The present disclosure relates to integrated routing and bridging (IRB) route reduction in an Ethernet Virtual Private Network (EVPN).

BACKGROUND

An EVPN may include many provider edge (PE) nodes that are homed to the same subnet, referred to as a stretched subnet. In that configuration, the PE nodes advertise the same subnet route to other PE nodes via route reflectors. This is scaled upward through automated processes that configure large numbers of PE nodes of the EVPN uniformly with the same stretched subnet. Given that not every PE node must home to the same subnet, all of the PE nodes are required to advertise, in some scenarios redundantly, the same subnet route in the network. Given the large number of PE nodes, redundant route advertising and storage introduces a significant burden on software/control plane resources and hardware resources of the PE nodes and the route reflectors (collectively referred to as network devices). The software/control plane resource burden may include unnecessary processing and unnecessary storage of information by a central processing unit (CPU)/memory of the network devices with respect to executing the Border Gate Protocol (BGP), populating routing information base (RIB) resources, and programming the hardware resources of the network devices, for example. The hardware burden may include unnecessary consumption of forwarding information base (FIB) and equal-cost multi-path (ECMP) resources of an application specific integrated circuit (ASIC) of the network devices, for example.

DESCRIPTION OF EXAMPLE EMBODIMENTS

Overview

Figure 1:
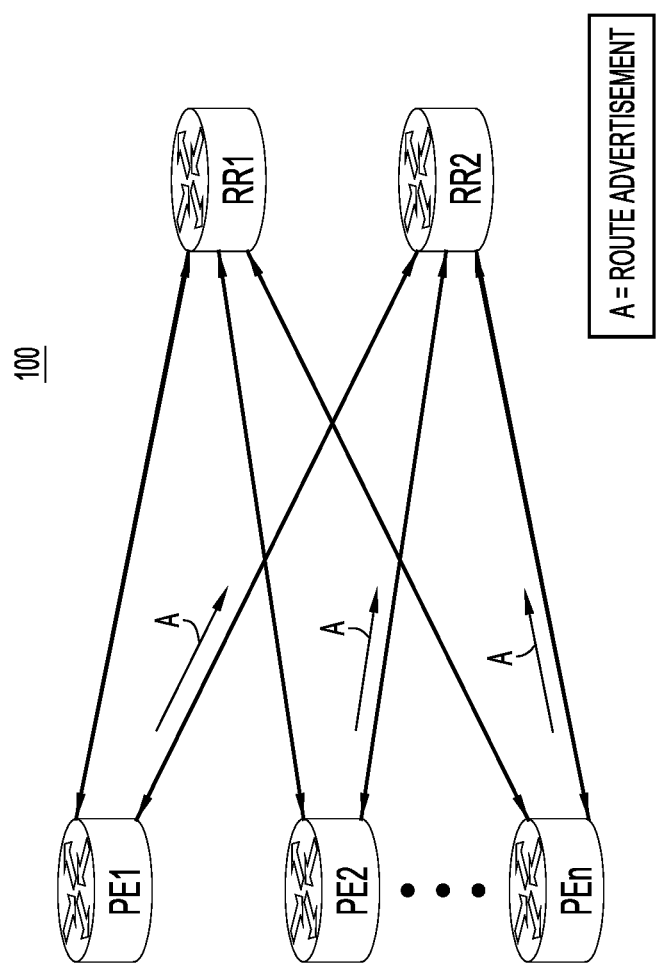
FIG. 1 is a block diagram of an Ethernet virtual private network (EVPN) in which integrated routing and bridging (IRB) route reduction may be implemented, according to an embodiment.

A method is performed at a provider edge node configured to communicate with remote provider edge nodes over an Ethernet virtual private network. The method includes receiving, from the remote provider edge nodes, route advertisements for a common subnet hosted on each of the remote provider edge nodes. The route advertisements include remote route distinguishers that are distinct from each other, a common Internet Protocol (IP) prefix for the common subnet, and remote paths for the common subnet. The method further includes determining whether there are at least a predetermined number of the remote paths preferred over a local path for the common subnet hosted on the provider edge node based on the remote route distinguishers and a local route distinguisher for the local path. The method also includes, when there are at least the predetermined number of the remote paths preferred over the local path, suppressing sending of a route advertisement for the local path for the common subnet.

Example Embodiments

Internet Protocol (IP)-based switch fabrics (referred to as IP-fabrics), such as a leaf/spine topology, commonly use a concept of wide equal-cost multi-path (ECMP) and host-based routing. In scenarios where such IP-fabrics are extended by using overlays with Ethernet virtual private network (EVPN) constructs, an integrated Layer-2 (L2)/Layer-3 (L3) solution is provided. Certain host-based routing scenarios that involve waking-up "silent" hosts can create a significant negative impact on forwarding information based (FIB) and ECMP resource consumption in network routers.

A "silent" host connected to an IP-fabric is characterized by an expired media access control (MAC)/IP binding for the silent host in an address resolution protocol (ARP) table in the IP-fabric while the host itself is actually present. There are various reasons why a silent host may exist, such as misaligned ARP caches or deficient Transmission Control Protocol (TCP)/IP stacks. Regardless of the reason, the host itself may not be a primary concern. Rather, a route overload problem arises when a remote device (i.e., another host) connected to the IP-fabric intends to communicate with the silent host, because the IP-fabric is unaware of the presence and location of the silent host. To mitigate this, the IP-fabric triggers the silent host to "wake-up" and participate in a "glean" operation, which employs an ARP request, from the IP-fabric directed toward a last hop router or provider edge (PE) node of a subnet of the silent host, for the presence and location of the silent host.

[on] Given that the IP-fabric (more generally referred to as a network) is unaware of the presence and location of the silent host, a longer prefix route must exist to attract traffic to the PE node of the network that is connected to the silent host. The longer prefix route is specific to the subnet where the silent host resides and to which the IP address of the host belongs. In a network with a distributed anycast gateway, any or every PE node of the network can be the last hop provider for such a subnet.

In a case where the subnet of the silent host is local to one PE node, there is no requirement for any optimization with respect to advertised subnet routes as host subnet routes may be suppressed and a fall back to the subnet route for the silent host is an option. In a case when many PE nodes are homed to the same subnet, referred to as a stretched subnet, each of the PE node nodes advertises the same subnet route. This is scaled upward through automated processes that configure large numbers of (but not necessarily all) PE node nodes of a network uniformly with the same "stretched" subnet. Given that not every PE node must home the same subnet, the PE nodes are required to advertise, often redundantly, the same subnet route in the network. For example, considering a network with 100, 200, or even 500 PE nodes, in which each PE node homes to multiple such stretched subnets, redundant route advertising introduces a significant burden on available BGP, RIB, FIB, and ECMP resources. Although obvious optimizations like "maximum-paths" configuration can help to reduce FIB and ECMP resources to some extent by limiting the number of installed routes in the PE nodes, they will not help in the BGP scale at the PE nodes and especially the route reflectors.

Accordingly, embodiments presented herein for integrated routing and bridging (IRB) route reduction aim to reduce the negative impact of redundant subnet route advertisements to the available BGP, RIB, FIB, and ECMP resources, while keeping the (ARP) glean functionality intact. The embodiments achieve this through an automated election of a subset of the PE nodes of a network for the glean. Then, only the subset of subnet routes originating from the subset of PE nodes are installed in RIB and FIB resources of the PE node. This reduces the burden on consumption of the BGP, RIB, FIB, and ECMP resources by keeping the consistent configuration and possibility of advertising of the subnet route intact.

Referring first to FIG. 1, there is a block diagram of an example EVPN 100 in which the embodiments directed to IRB route reduction may be implemented. EVPN 100 includes PE nodes PE1-PEn and router reflectors (RRs) RR1 and RR2, configured to communicate with each other over various network links, as shown. In the ensuing description a PE node and PE nodes are also referred to simply as a PE and PEs, respectively. Also, a PE node PEi (e.g., PE node PE1) is referred to simply as PEi (e.g., PE1). PE1-PEn and the route reflectors are connected to each other in a leaf/spine topology having leaf nodes and spine nodes represented by the PEs and the route reflectors, respectively. PE1-PEn are connected to customer edge (CE) nodes or devices (referred to simply as CEs) and/or host devices (referred to simply as hosts) (not specifically shown in FIG. 1), which may communicate with each other via PE1-PE4. In other words, PE1-PE4 forward traffic (e.g., packets) between the CEs/hosts to which the PEs are connected.

In the embodiments presented herein, PE1-PE4 provide IRB functionality. IRB provides a dynamic and efficient solution for inter-subnet connectivity between tenant systems connected to the PEs. To implement the IRB functionality, the PEs each include one or more IRB interfaces configured with or that host (IRB) subnets for instances of virtual routing and forwarding (VRFs). The IRB interfaces connect bridging tables to the VRFs (more specifically, to IP-VRFs). An IRB interface is sometimes referred to as a bridge virtual interface (BVI)/switch virtual interface (SVI) (BVI/SVI) interface, or simply a BVI interface.

EVPN 100 may employ the Border Gateway Protocol (BGP) to advertise subnet routes, including subnet reachability information or paths, among the PEs of the EVPN. Under BGP, each of the PEs sends to the route reflectors advertisements (indicated generally as "A" in FIG. 1) of EVPN type-5 routes for subnets hosted or configured with IRB interfaces of the PEs. An EVPN type-5 route (referred to alternatively as an IP prefix route or a subnet route) includes, in part, a unique route distinguisher (RD) (e.g., a numeric value) specific to a PE, an IP prefix for a subnet hosted on the PE, and a path for the subnet (e.g., next hop reachability information for the subnet, such as an IP address). The route reflectors forward each advertisement of an EVPN type-5 route originated at a PE to other PEs of EVPN 100. When the other PEs receive the EVPN type-5 routes from the route reflectors, the PEs store the paths associated with the (advertised) routes in their local routing tables, e.g., in a local BGP routing table. This is referred to herein as installing or importing the route or path into the relevant VRF migration between BGP confederations and route reflection table.

The problem of proliferating redundant routes for stretched subnets in an EVPN is described below in connection with FIG. 2. Then, examples of IRB route reduction that may be performed in EVPN 100 to solve the problem are described in connection with FIGS. 3 and 4.

Figure 2:
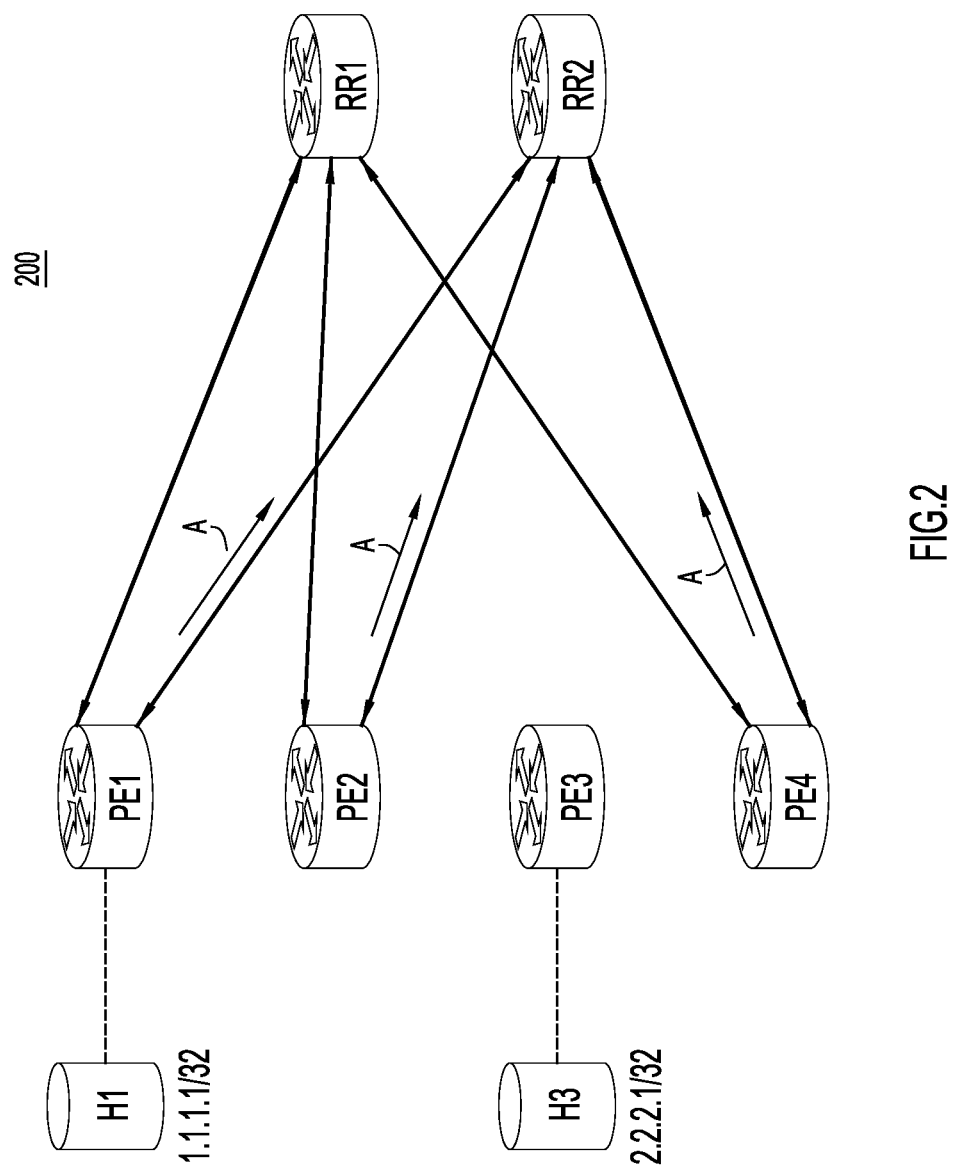
FIG. 2 is a block diagram of an EVPN that is useful for describing proliferation of redundant routes for stretched subnets using existing Border Gateway Protocol (BGP) procedures.

FIG. 2 is a block diagram of an example EVPN 200 that is useful for describing the problem of proliferating redundant routes for stretched subnets using BGP procedures under different stretched-subnet configurations of the EVPN. Under a first stretched-subnet configuration, a first subnet having IP prefix 1.1.1.0/24 (i.e., subnet 1.1.1.0/24) and a second subnet having IP prefix 2.2.2.0/24 (i.e., subnet 2.2.2.0/24) in a VRF are each hosted in each PE with a corresponding IRB interface. In other words, PE1-PE4 each have respective IRB interfaces that host, or are configured with, subnet 1.1.1.0/24 and subnet 1.1.1.0/24. The first subnet and the second subnet are each considered a stretched subnet that is configured in common on/across the IRB interfaces of multiple PEs (e.g., PE1-PE4). A host H1 with IP address 1.1.1.1/32 is connected to PE1, and a silent host H3 with IP address 2.2.2.1/32 is connected to PE3.

Under the first stretched-subnet configuration, PE1-PE4 each advertise an EVPN type-5 route (i.e., a subnet route) for subnet 1.1.1.0/24 and an EVPN type-5 route for subnet 2.2.2.0/24 to every other PE via the route reflectors. Thus, each PE receives the advertisements of EVPN type-5 routes for subnet 1.1.1.0/24 and for subnet 2.2.2.0/24 from every other PE. In turn, each PE imports, into entries of its local BGP routing table, "remote" paths for the subnets advertised by the other "remote" PEs (e.g., from the perspective of PE1, PE2-PE4 are considered remote PEs). That is, the entries represent remote paths for subnet 1.1.1.0/24 and for subnet 2.2.2.0/24. Moreover, because each PE hosts both subnet 1.1.1.0/24 and subnet 2.2.2.0/24 locally (with its local IRB interfaces), each PE has local paths for the subnets in addition to the remote paths for the subnets as advertised by the other PEs.

Host H1 intends to communicate with silent host H3, and needs the IP address of silent host H3 to reach host H3 via routing; however, because host H3 is a silent, there is no detailed/exact reachability information for host H3 in the VRF routing table of any of PE1-PE4. Moreover, PE1 has only subnet-level reachability information associated with host H3 based on the above-mentioned advertisements of the EVPN type-5 routes. That is, PE1 has the remote paths for 2.2.2.0/24 from PE2-PE4, and has the local path for subnet 2.2.2.0/24.

When host H1 sends traffic destined for host H3 to PE1, the traffic is received at the IRB interface of PE1. There, the associated VRF routing table for the exact prefix of 2.2.2.1/32 registers a miss due to the fact that host H3 is silent. Thus, PE1 choses its corresponding local path for the subnet. Because there is no MAC/IP binding for host H3 present at PE1, the PE triggers a glean, locally. That is, PE1 creates an ARP request and originates the ARP request from the local IRB interface for subnet 2.2.2.0/24. PE1 forwards the ARP request (broadcast) via L2 to all remote PEs, i.e., to PE2, PE3, and PE4, and subsequently to host H3 connected to PE3.

Upon receiving the ARP request, host H3 responds with an ARP reply (unicast) toward the IRB interface for subnet 2.2.2.0/24 on PE3 (this requires a same IRB MAC on all PEs, also known as an anycast gateway MAC (AGM)). The ARP reply facilitates learning of the MAC/IP binding on PE3, and triggers PE3 to send an advertisement of an EVPN type-2 route, corresponding to host H3 (i.e., its MAC/IP). PE1 receives the EVPN type-2 route. Subsequently, traffic can be routed most optimally from host H1 to PE1, to PE3, and finally to host H3.

In summary, given that both subnets 1.1.1.0/24 and 2.2.2.0/24 exist on every PE under the first stretched-subnet configuration described above, glean is performed locally by PE1, through which PE1 learns detailed reachability information for host H3. Thus, the initial EVPN type-5 routes that PE1 received from the other PEs are redundant to the glean, and the information from the redundant EVPN type-5 routes occupies FIB/RIB resources in the PEs, unnecessarily. In addition, the redundant route advertisements unnecessarily consume BGP and RIB software resources in the router reflectors.

Under a second stretched-subnet configuration, only PE1 hosts subnet 1.1.1.0/24 with an IRB interface, and advertises the subnet as an EVPN type-5 route originated from the PE. Thus, PE1 has a local path for subnet 1.1.1.0/24. On the other hand, subnet 2.2.2.0/24 is hosted only on PE2, PE3, and PE4, with their IRB interfaces. Subnet 2.2.2.0/24 is advertised as an EVPN type-5 route originated from each of PE2, PE3, and PE4 as an ECMP route. Based on the advertised EVPN type-5 routes, PE1 installs/imports remote paths for subnet 2.2.2.0/24 from PE2, PE3, and PE4. Thus, PE1 has multiple next hop (ECMP) paths for subnet 2.2.2.0/24.

As described above, host H1 needs to communicate with host H3. Thus, host H1 needs the IP address of host H3 to reach that host via routing. As before, host H3 is a silent host. Therefore, there is no detailed path information for host H3 in the VRF routing table of any of PE1-PE4. Traffic originated from host H1 and destined for host H3 is received at the IRB interface on PE1, where the VRF routing table for the exact prefix of 2.2.2.1/32 registers a miss. Hence, PE1 choses one of the remote paths for subnet 2.2.2.0/24 in the routing table. Because there are multiple next hop paths for subnet 2.2.2.0/24, hashing is used to select the next hop, e.g., PE2.

Upon selecting PE2, PE1 forwards the traffic from host H1 to PE2. PE2 receives the traffic and triggers a glean at PE2 because there is no MAC/IP binding for host H3 present. That is, PE2 creates an ARP and originates the ARP request from the IRB interface for subnet 2.2.2.0/24. PE2 forwards the ARP request (broadcast) via L2 to all other PEs, and subsequently to host H3 connected to PE3.

Upon receiving the ARP request, host H3 responds with an ARP reply (unicast) towards the IRB interface on PE3 (which requires the same IRB MAC on all PEs). The ARP reply facilitates learning of the MAC/IP binding on PE3, and results in an EVPN type-2 route advertisement being sent by PE3 corresponding to host H3 (MAC/IP).

PE1 receives the EVPN type-2 route advertisement, and then traffic can be routed most optimally from host H1 to PE1, to PE3, and finally to H3.

In summary, under the second stretched-subnet configuration, it suffices that each PE receives only one advertisement of an EVPN type-5 route corresponding to 2.2.2.0/24 PE1 from the other PEs, PE2-PE4. The remaining advertisements of EVPN type-5 routes are redundant and their corresponding reachability information/path information unnecessarily occupies FIB and RIB resources on the PEs, and unnecessarily consumes BGP and RIB resources in the route reflectors.

From the examples described in connection with FIG. 2, it is seen that conventional BGP-related processes populate a BGP table in each PE with the same common (IRB) subnet from every other (remote) PE. This causes a substantial memory increase in each PE of approximately (no. of IRBs•no. of PEs•no. of L3 VRFs), even though each PE may only need one EVPN type-5 route, excluding its locally generated instance. Accordingly, the embodiments provided herein (described below) reduce the redundant advertisements of EVPN type-5 routes.

Figure 3:
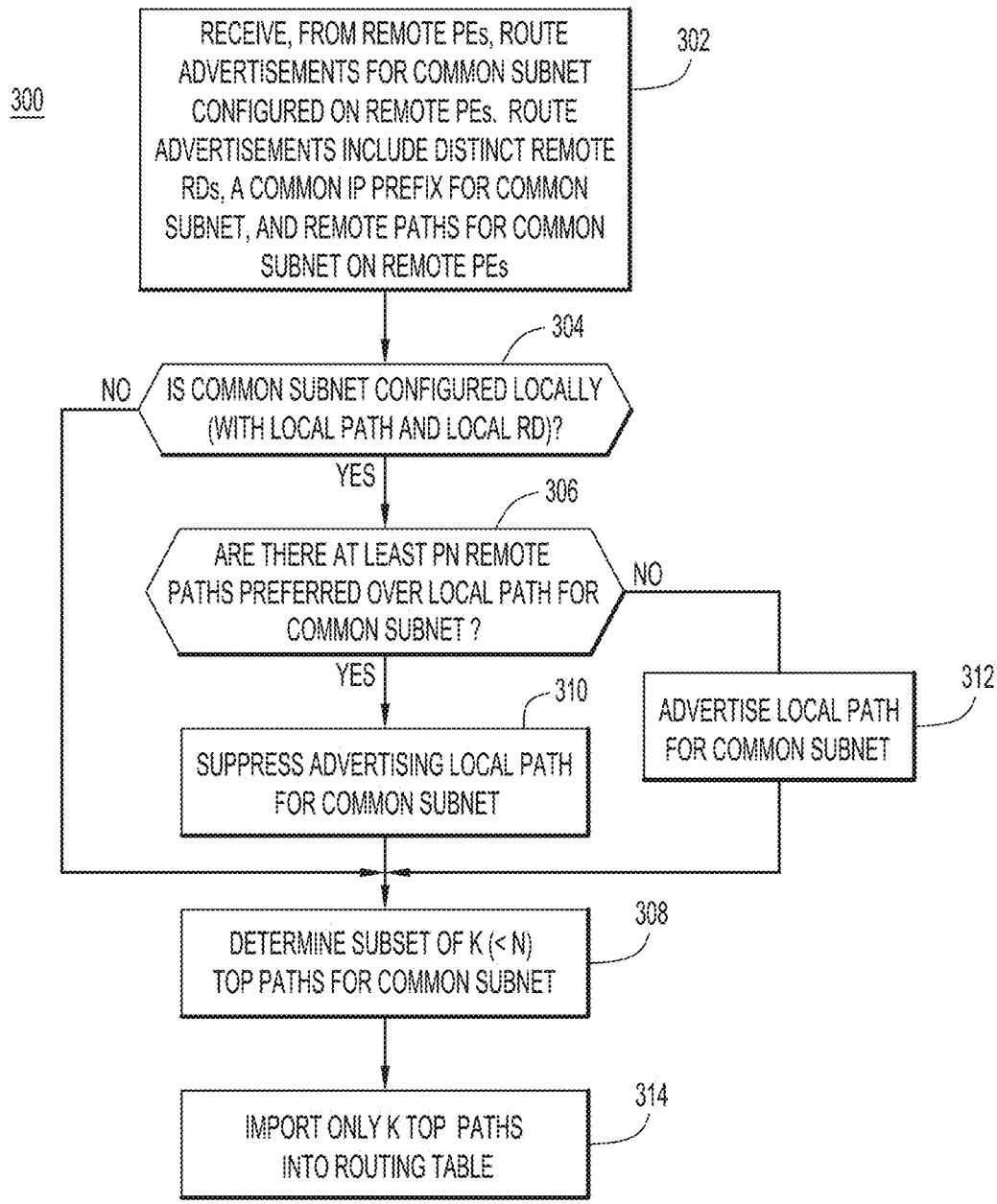
FIG. 3 is a flowchart of a method of IRB route reduction for a stretched subnet performed by a provider edge (PE) node of the EVPN of FIG. 1, according to an embodiment.

With reference to FIG. 3, there is a flowchart of an example method 300 of IRB route reduction for a stretched subnet performed by a PE (e.g., PE1) of an EVPN (e.g., EVPN 100). Method 300 reduces the number of redundant EVPN type-5 route advertisements for the stretched subnet and, correspondingly, the number of redundant paths for the stretched subnet that are imported into FIB and RIB resources of the EVPN, compared to when the method is not used. In some aspects, method 300 may be considered a modification/improvement to conventional BGP procedures.

Method 300 may be performed independently by each PE of the EVPN. Method 300 assumes that at least some of the PEs have IRB interfaces configured with a common (i.e. the same) subnet that represents the stretched subnet. In an example, the common subnet may be configured on n PEs of the EVPN, where n is in a range of 10-1000, for example, although n may fall outside of that range.

At 302, the PE receives, from remote PEs relative to the PE, respective route advertisements (e.g., BGP EVPN type-5 route advertisements) for the common subnet configured independently on each of the remote PEs. Each route advertisement advertises a remote subnet route for the common subnet, and includes:

a. An RD (referred to as a remote RD) that is distinct (i.e., different from) remote RDs of other subnet routes that are advertised for the common subnet.
  b. An IP prefix (referred to as a common IP prefix) for/that identifies the common subnet configured on the remote PE that originated the route advertisement.
  c. A path (referred to as a remote path) for the common subnet on the remote PE that originated the route advertisement, e.g., an IP address of the next hop (NH) PE.

In summary, the remote subnet routes include remote RDs that are distinct from each other, a common IP prefix for the common subnet that is stretched across the remote PEs, and remote paths for the PEs that host the common subnet. Like the remote RDs, the remote paths are distinct from each other.

At 304, the PE determines whether the common subnet is configured locally (i.e., with a local path) on the PE, with a local IRB interface. For example, the PE determines whether the common IP prefix from the route advertisements matches an IP prefix configured locally with an associated local RD for the local path. The local RD will be distinct from the remote RDs. When the common subnet is configured locally on the PE, flow proceeds to 306. When the common subnet is not configured locally on the PE, flow proceeds to 308.

At 306, the PE determines whether there are at least a predetermined number PN of the remote paths that are preferred over the local path for the common subnet based on the remote RDs and the local RD. Example values of PN may be 2 and 3, although other values are possible. The value of PN may be pre-configured on the PE. The PE prefers a remote path over the local path when the remote RD for the remote path exceeds the local RD for the local path. Thus, the PE compares each of the remote RDs to the local RD. When results of the comparing indicate that there are at least PN remote RDs that exceed the local RD, the PE declares that there are at least PN remote paths preferred over the local path.

When there are at least PN remote paths preferred over the local path, flow proceeds to 310. When there are not at least PN remote paths preferred over the local path, flow proceeds to 312.

At 310, the PE suppresses advertising an EVPN type-5 route for the common subnet configured locally on the PE. That is, the PE does not send the EVPN type-5 route for the locally configured common subnet to the route reflectors of the EVPN. Flow proceeds to 308.

At 312, the PE advertises an EVPN type-5 route for the common subnet configured locally on the PE to the route reflectors, in accordance with existing BGP procedures. Flow proceeds to 308.

At 308, the PE determines k (where k<n) most preferred or top paths for the common subnet among all available paths for the common subnet based on all available RDs associated with the common subnet, where n is a total number of available paths for the common subnet. The k top paths are substantially fewer in number than the available paths, and thus represent a small subset or fraction of the available paths. Example values for k may be in a range of 2-6 (although other values are possible), while n may be in a range of 10-1000, for example.

In a case where the PE is not configured locally with the common subnet, the PE determines the k top paths among the remote paths based on only the remote RDs. Alternatively, when the PE is configured locally with the common subnet, the PE determines the k top paths among the remote paths and the local path based on the remote RDs and the local RD combined. In an example, to determine the k top paths, the PE determines the highest k RDs among all of the available RDs, and then selects the k top paths as those corresponding to/having the k highest RDs. Flow proceeds to 314.

At 314, the PE imports or installs only the k top paths for the common subnet in the local FIB/RIB resources, e.g., in the local BGP routing table.

The PE repeats method 300 over time, e.g., when each EVPN type-5 route advertisements for the common subnet is received.

In a variation of method 300, the route advertisements each further includes a route reduction indicator or flag that is configured to trigger route reduction operations 304-314. Thus, the PE may determine whether each of the route advertisements includes the route reduction indicator. When the route reduction indicator is present in a given route advertisement, the PE triggers/performs the route reduction operations with respect to that route advertisement (in combination with other route advertisements that similarly include the indicator). When the route reduction indicator is not present in the given route advertisement, the PE does not trigger/perform the route reduction operations with respect to that route advertisement. In an example, the route reduction indicator may be included as/in a new BGP extended community (EC) for the given EVPN type-5 route advertisement.

Figure 4:
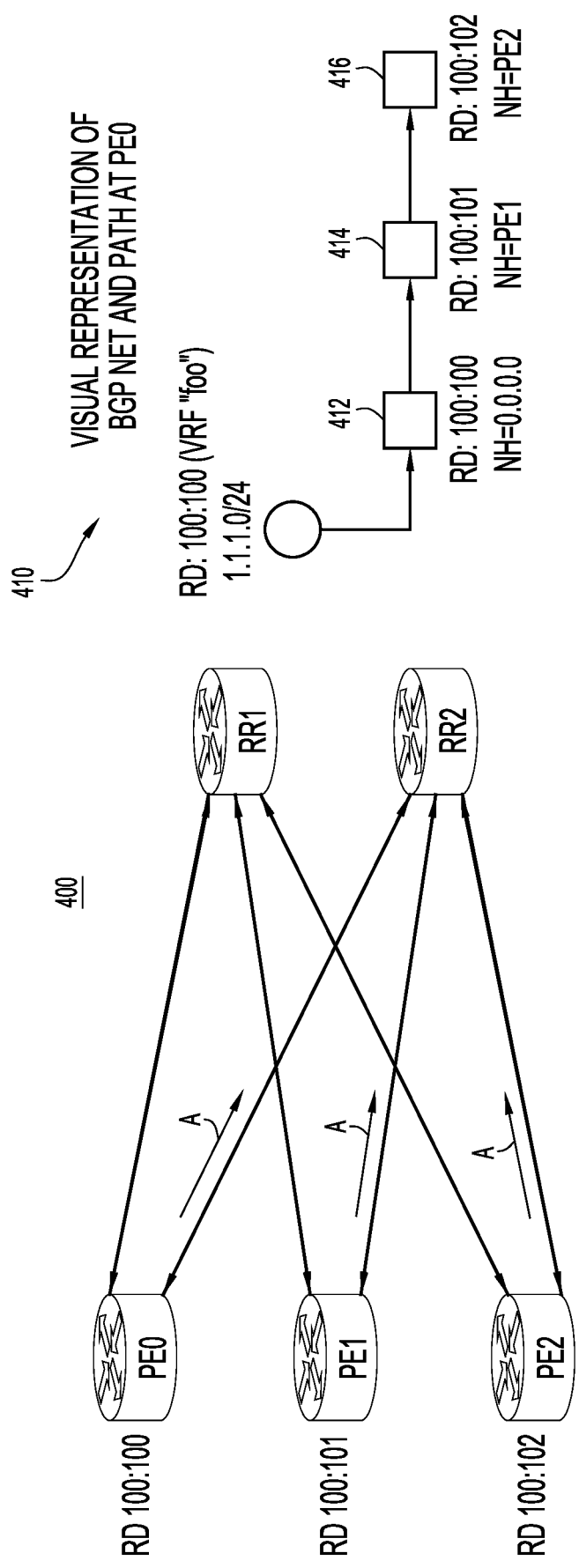
FIG. 4 is an illustration of an IRB route reduction solution implemented in an EVPN that includes three PE nodes, according to an embodiment.

With reference to FIG. 4, there is an illustration of an example IRB route reduction solution implemented in an example EVPN 400 including PE0, PE1, and PE2 each configured with stretched/common subnet 1.1.1.0/24. Subnet 1.1.1.0/24 resides under an L3 VRF "foo," with RD as 100:100 on PE0. Each PEi (e.g., i=0, 1, and 2) initially advertises its subnet route(i) as RDi:1.1.1.0/24, Li, and NHi for PEi, where Li is a length indicator, and NHi is a NH IP address for the PEi. Each PEi performs method 300 independently based on the route advertisements originated by, and received from, remote PEs relative to the PEi. In the example of FIG. 4, the route advertisements each include the new EC that includes the route reduction indicator, as described above.

Consider method 300 executing on PE0. When PE0 receives EVPN type-5 route advertisements for two remote paths for common subnet 1.1.1.0/24 from PE1 and PE2, PE0 determines that the two remote paths have higher RDs (e.g., remote PE1 RD=100:101 and remote PE2 RD=100:102) than itself (e.g., local PE0 RD=100:000). Assuming that PN=2, then the condition to suppress route advertising from PE0 is met, and PE0 suppresses sending EVPN type-5 route advertisements for locally configured common subnet 1.1.1.0/24. In addition, assuming k=2 for k top path evaluation, PE0 determines that the two remote paths are the k top paths, and installs these paths for the common subnet.

At 410, there is shown a visual representation of a BGP net and path for common subnet 1.1.1.0/24 established at PE0. Visual representation 410 includes: a local path 412 with RD 100:100 configured under an IRB, and next hop 0.0.0.0 for PE0; a remote path 414 with RD 100:101 with a next hop for PE1; and a remote path 416 with RD 100:102 with a next hop for PE2. Remote paths for common subnet 1.1.1.0/24 provided by PE1 (RD 100:101) and PE2 (100: 102) are preferred. Local path (RD 100:100) is still a best path, but it is not advertised.

Limiting the advertisements of the number of EVPN type-5 routes leads to significant advantages. For example, there can be a significant savings in route scale of approximately (no. of IRBs•no. of PEs•no. of L3 VRFs) in the BGP routing tables in the PEs as well as the RRs. Improvement can be achieved in control plane convergence because each subnet has only a few BGP paths; this improvement increases significantly as the IRB scale increases. Savings can be achieved in the ECMP scale (horizontal and vertical). The ECMP forwarding equivalence class (FEC) cost is proportional to the number of individual paths in the subnet. By limiting to only a few paths per subnet (at most two remote paths in an example in which PN=2), there is a large reduction in ECMP resources in the FIB. Finally, no upgrade to the route reflectors is needed, no standardization is needed, and the solution is straightforward to implement across router operating systems.

Figure 5:
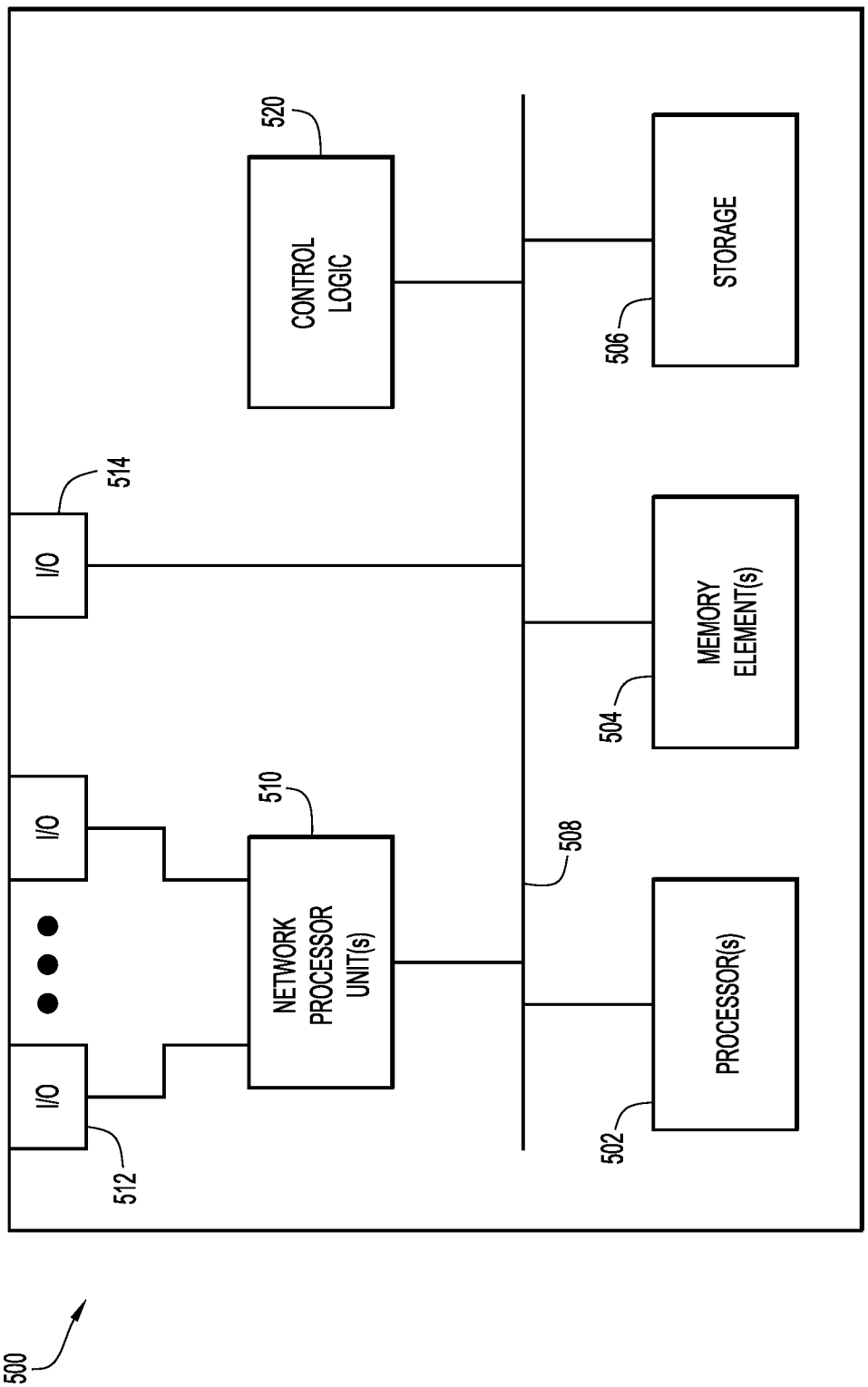
FIG. 5 is a block diagram of a network device, representative of a PE node in an EVPN, according to an embodiment.

Referring to FIG. 5, FIG. 5 illustrates a hardware block diagram of a computing device 500 that may perform functions associated with operations discussed herein in connection with the techniques depicted in FIGS. 1, 3, and 4. In various embodiments, a computing device, such as computing device 500 or any combination of computing devices 500, may be configured as any entity/entities as discussed for the techniques depicted in connection with FIGS. 1, 3, and 4 in order to perform operations of the various techniques discussed herein. For example, computing device 500 may operate as a network device representative of a provider edge node.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner. In an example, processing and storage of information associated with BGP and RIB resources may be performed by processor(s) 502 and memory/storage 504/506.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In an example, network processor unit(s) 510 may be configured with FIB and ECMP resources described above. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computer device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), EVPN, Low Power Network (LPN), Low Power Wide Area Network (LPWAN), Machine to Machine (M2M) network, Internet of Things (IoT) network, BIER network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 5 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in a first aspect, a method is provided comprising: at a provider edge node configured to communicate with remote provider edge nodes over an Ethernet virtual private network: receiving, from the remote provider edge nodes, route advertisements for a common subnet hosted on each of the remote provider edge nodes, the route advertisements including remote route distinguishers that are distinct from each other, a common Internet Protocol (IP) prefix for the common subnet, and remote paths for the common subnet; and determining whether there are at least a predetermined number of the remote paths preferred over a local path for the common subnet hosted on the provider edge node based on the remote route distinguishers and a local route distinguisher for the local path; and when there are at least the predetermined number of the remote paths preferred over the local path, suppressing sending of a route advertisement for the local path for the common subnet.

In a second aspect, an apparatus is provided comprising: multiple network input/output interfaces; and a processor of a provider edge node configured to communicate with remote provider edge nodes over an Ethernet virtual private network, the processor coupled to the multiple network input/output interfaces and configured to perform: receiving, from the remote provider edge nodes, route advertisements for a common subnet hosted on each of the remote provider edge nodes, the route advertisements including remote route distinguishers that are distinct from each other, a common Internet Protocol (IP) prefix for the common subnet, and remote paths for the common subnet; determining whether there are at least a predetermined number of the remote paths preferred over a local path for the common subnet hosted on the provider edge node based on the remote route distinguishers and a local route distinguisher for the local path; and when there are at least the predetermined number of the remote paths preferred over the local path, suppressing sending of a route advertisement for the local path for the common subnet.

In a third aspect, a non-transitory computer readable medium is provided. The computer readable medium is encoded with instructions that, when executed by a processor of a provider edge node configured to communicate with remote provider edge nodes over an Ethernet virtual private network, cause processor to perform: receiving, from the remote provider edge nodes, route advertisements for a common subnet hosted on each of the remote provider edge nodes, the route advertisements including remote route distinguishers that are distinct from each other, a common Internet Protocol (IP) prefix for the common subnet, and remote paths for the common subnet; determining whether there are at least a predetermined number of the remote paths preferred over a local path for the common subnet hosted on the provider edge node based on the remote route distinguishers and a local route distinguisher for the local path; and when there are at least the predetermined number of the remote paths preferred over the local path, suppressing sending of a route advertisement for the local path for the common subnet.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a provider edge node configured to communicate with remote provider edge nodes over an Ethernet virtual private network:
   receiving, from the remote provider edge nodes, route advertisements for a common subnet hosted on each of the remote provider edge nodes, the route advertisements including remote route distinguishers that are distinct from each other, a common Internet Protocol (IP) prefix for the common subnet, and remote paths for the common subnet;
   determining whether there are at least a predetermined number of the remote paths preferred over a local path for the common subnet hosted on the provider edge node by comparing each of the remote route distinguishers to a local route distinguisher for the local path, and when the comparing indicates that there are at least the predetermined number of the remote route distinguishers that have values that exceed a value of the local route distinguisher, declaring that there are at least the predetermined number of the remote paths; and
   when there are at least the predetermined number of the remote paths preferred over the local path, suppressing sending of a route advertisement for the local path for the common subnet in order to avoid sending redundant subnet advertisements to the remote provider edge nodes.

2. The method of claim 1, wherein the common subnet is configured with integrated routing and bridging (IRB) interfaces on the provider edge node and the remote provider edge nodes, and the route advertisements associated with the receiving and the suppressing sending include Border Gateway Protocol (BGP) Ethernet virtual private network (EVPN) type 5 route advertisements.

3. The method of claim 1, further comprising, at the provider edge node:
   when there are not at least the predetermined number of the remote paths preferred over the local path, advertising the local path for the common subnet.

4. The method of claim 1, wherein the values of the remote route distinguishers and the value of the local route distinguisher are each numeric.

5. The method of claim 1, further comprising:
   determining a subset of the remote paths and the local path as top paths based on the remote route distinguishers and the local route distinguisher, wherein the top paths are fewer in number than the remote paths and the local path combined; and
   importing only the top paths into a routing table of the provider edge node.

6. The method of claim 5, wherein the importing includes importing respective next hop reachability information for the top paths.

7. The method of claim 1, wherein the route advertisements from the receiving each further includes a route reduction indicator configured to trigger the determining and the suppressing, and the method further comprises, at the provider edge node:
   triggering the determining and the suppressing based on the route reduction indicator in each of the route advertisements.

8. The method of claim 7, wherein the route advertisements include Border Gateway Protocol (BGP) Ethernet virtual private network (EVPN) type 5 route advertisements that each include the route reduction indicator as an extended community.

9. The method of claim 1, further comprising, at the provider edge node:
   determining whether the local path for the common subnet is hosted on the provider edge node; and
   when the local path for the common subnet is hosted on the provider edge node, performing the determining and the suppressing.

10. The method of claim 9, further comprising, at the provider edge node:
    when the local path for the common subnet is not hosted on the provider edge node:
      not performing the determining and the suppressing;
      determining a subset of the remote paths as top paths based on the remote route distinguishers, where the top paths are fewer in number than a total number of the remote paths; and
      importing only the top paths into a routing table of the provider edge node.

11. An apparatus comprising:
    multiple network input/output interfaces; and
    a processor of a provider edge node configured to communicate with remote provider edge nodes over an Ethernet virtual private network, the processor coupled to the multiple network input/output interfaces and configured to perform:
      receiving, from the remote provider edge nodes, route advertisements for a common subnet hosted on each of the remote provider edge nodes, the route advertisements including remote route distinguishers that are distinct from each other, a common Internet Protocol (IP) prefix for the common subnet, and remote paths for the common subnet;
      determining whether there are at least a predetermined number of the remote paths preferred over a local path for the common subnet hosted on the provider edge node by comparing each of the remote route distinguishers to a local route distinguisher for the local path, and when the comparing indicates that there are at least the predetermined number of the remote route distinguishers that have values that exceed a value of the local route distinguisher, declaring that there are at least the predetermined number of the remote paths; and
      when there are at least the predetermined number of the remote paths preferred over the local path, suppressing sending of a route advertisement for the local path for the common subnet.

12. The apparatus of claim 11, wherein the common subnet is configured with integrated routing and bridging (IRB) interfaces on the provider edge node and the remote provider edge nodes, and the route advertisements associated with the receiving and the suppressing sending include Border Gateway Protocol (BGP) Ethernet virtual private network (EVPN) type 5 route advertisements.

13. The apparatus of claim 11, wherein the processor is further configured to perform:
    when there are not at least the predetermined number of the remote paths preferred over the local path, advertising the local path for the common subnet.

14. The apparatus of claim 11, wherein the values of the remote route distinguishers and the value of the local route distinguisher are each numeric.

15. The apparatus of claim 11, wherein the processor is further configured to perform:
    determining a subset of the remote paths and the local path as top paths based on the remote route distinguishers and the local route distinguisher, wherein the top paths are fewer in number than the remote paths and the local path combined; and
    importing only the top paths into a routing table of the provider edge node.

16. The apparatus of claim 11, wherein the route advertisements from the receiving each further includes a route reduction indicator configured to trigger the processor to perform the determining and the suppressing, and the processor is further configured to perform:
    triggering the determining and the suppressing based on the route reduction indicator in each of the route advertisements.

17. The apparatus of claim 16, wherein the route advertisements include Border Gateway Protocol (BGP) Ethernet virtual private network (EVPN) type 5 route advertisements that each include the route reduction indicator as an extended community.

18. A non-transitory computer readable medium encoded with instructions that, when executed by a processor of a provider edge node configured to communicate with remote provider edge nodes over an Ethernet virtual private network, cause the processor to perform:
    receiving, from the remote provider edge nodes, route advertisements for a common subnet hosted on each of the remote provider edge nodes, the route advertisements including remote route distinguishers that are distinct from each other, a common Internet Protocol (IP) prefix for the common subnet, and remote paths for the common subnet;

determining whether there are at least a predetermined number of the remote paths preferred over a local path for the common subnet hosted on the provider edge node by comparing each of the remote route distinguishers to a local route distinguisher for the local path, and when the comparing indicates that there are at least the predetermined number of the remote route distinguishers that have values that exceed a value of the local route distinguisher, declaring that there are at least the predetermined number of the remote paths; and when there are at least the predetermined number of the remote paths preferred over the local path, suppressing sending of a route advertisement for the local path for the common subnet.

19. The non-transitory computer readable medium of claim 18, wherein the common subnet is configured with integrated routing and bridging (IRB) interfaces on the provider edge node and the remote provider edge nodes, and the route advertisements associated with the receiving and the suppressing sending include Border Gateway Protocol (BGP) Ethernet virtual private network (EVPN) type 5 route advertisements.

20. The non-transitory computer readable medium of claim 18, further comprising instructions to cause the processor to perform:

determining a subset of the remote paths and the local path as top paths based on the remote route distinguishers and the local route distinguisher, wherein the top paths are fewer in number than the remote paths and the local path combined; and importing only the top paths into a routing table of the provider edge node.

* * * * *